US006697956B1

(12) United States Patent
Miller

(10) Patent No.: US 6,697,956 B1
(45) Date of Patent: Feb. 24, 2004

(54) METHOD AND APPARATUS FOR PHRASE SYNCHRONIZING A PLURALITY OF MICROCONTROLLERS OF A DISTRIBUTED MICROCONTROLLER NETWORK IN A BRAKE-BY-WIRE AUTOMOBILE BRAKING SYSTEM

(75) Inventor: Peter Miller, Sheffrord (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/495,197

(22) Filed: Jan. 31, 2000

(30) Foreign Application Priority Data

Aug. 3, 1999 (GB) ............................................... 9918324

(51) Int. Cl.$^7$ ................................................. G06F 1/12
(52) U.S. Cl. ........................................ 713/400; 713/401
(58) Field of Search .................................. 713/400, 401, 713/500

(56) References Cited

U.S. PATENT DOCUMENTS

| 3,555,194 A | * | 1/1971 | Goto ............................ 331/12 |
| 3,599,110 A | * | 8/1971 | Gindi ............................ 341/70 |
| 3,815,100 A | * | 6/1974 | Winchester et al. ........... 341/50 |
| 4,064,486 A | * | 12/1977 | Faber ........................ 340/825.2 |
| 5,726,650 A | * | 3/1998 | Yeoh et al. .................... 341/70 |

* cited by examiner

Primary Examiner—Thomas Lee
Assistant Examiner—Paul Yanchus, III

(57) ABSTRACT

A synchronization arrangement for a distributed microcontroller network has a number of distributed microcontrollers each having an internal clock frequency. Each microcontroller transmits data signals via the network. A frequency correction arrangement of each microcontroller is arranged adjust the internal clock frequency, in dependence upon a phase difference between the internal clock frequency and the logic level transitions of the data signals received via the network, such that the clock frequencies of the microcontrollers become phase-synchronized over time.

14 Claims, 2 Drawing Sheets

METHOD AND APPARATUS FOR PHRASE SYNCHRONIZING A PLURALITY OF MICROCONTROLLERS OF A DISTRIBUTED MICROCONTROLLER NETWORK IN A BRAKE-BY-WIRE AUTOMOBILE BRAKING SYSTEM

FIELD OF THE INVENTION

This invention relates to a method for synchronising a network, and particularly but not exclusively to a method for synchronising the clock frequencies of microcontrollers in a distributed microcontroller network.

BACKGROUND OF THE INVENTION

Distributed microcontroller systems are used widely in many fields, and increasingly so in automotive electronics applications. One example of such use is in electronic braking systems, which dispense with mechanical or hydraulic linkages and instead employ a communications bus which exchanges data between a driver operated actuator (brake pedal) and brake actuators attached to vehicle wheels. These actuators each have a microcontroller arranged to send and receive messages on the bus, for controlling the braking function of the vehicle.

It is important in a real-time application such as the so-called 'brake-by-wire' system mentioned above, that the clock frequencies of the microcontrollers are synchronised, such that a real-time measurement (such as the speed of a vehicle wheel) can be properly combined with other real-time measurements (such as the speed of the other wheels) in order to provide appropriate control functions for the system. Furthermore real-time instructions, such as an instruction to apply a brake at the nodes, should be executed at each of the nodes at the same time, otherwise differential forces acting upon the vehicle may cause it to become unbalanced during breaking.

A number of solutions exist for providing time synchronisation across a distributed network. In one example, all processing elements (microcontrollers) share a common clock, which is provided via the bus. A problem with this arrangement is that signal integrity and available data bandwidth are compromised. Furthermore, Electromagnetic Interference (EMI) is greatly increased when the processing elements are not co-located. These problems worsen as the distance between processing elements increases.

A second known solution employs dedicated synchronisation data messages transmitted on the bus. These are provided at regular intervals to ensure time synchronisation, and therefore negatively effect the available bandwidth on the bus available for control data.

These methods provide some degree of fault detection and fault tolerance, but with a significant overhead in terms of cost (for duplicate and redundant hardware), complexity and bandwidth.

This invention seeks to provide a synchronisation arrangement and method which mitigate the above mentioned disadvantages.

SUMMARY OF THE INVENTION

According to a first aspect of the present invention there is provided a synchronisation arrangement for a distributed microcontroller network, comprising: a plurality of distributed microcontrollers, each having an internal clock frequency and a frequency correction arrangement coupled to selectively adjust the internal clock frequency, each of the microcontrollers being further arranged to transmit data signals via the network, the data signals having periodic logic level transitions which are substantially synchronised to the internal clock frequency of the microcontroller, wherein each of the plurality of microcontrollers is arranged to selectively adjust its internal clock frequency in dependence upon a phase difference between the internal clock frequency and the logic level transitions of the data signals received via the network, such that the clock frequencies of the plurality of microcontrollers become substantially phase-synchronised.

According to a second aspect of the present invention there is provided a method for synchronising internal clock frequencies of a plurality of microcontrollers in a distributed microcontroller network, comprising the steps of: exchanging data signals between the plurality of microcontrollers via the network, the data signals having periodic logic level transitions which are substantially synchronised to the internal clock frequency of the microcontroller, adjusting the internal clock frequency of each of the microcontrollers in dependence upon a phase difference between the internal clock frequency and the logic level transitions of the data signals received via the network, such that the clock frequencies of the plurality of microcontrollers become substantially phase-synchronised.

Preferably the distributed microcontroller network is incorporated in an automobile, and the distributed microcontroller network is a brake-by-wire automobile braking system.

In this way synchronisation is readily achieved in a distributed microcontroller network, without duplicate and redundant hardware and in a relatively simple manner.

BRIEF DESCRIPTION OF THE DRAWINGS

An exemplary embodiment of the invention will now be described with reference to the drawings in which.

DETAILED DESCRIPTION OF A PREFERRED EMBODIMENT

Figure 1:
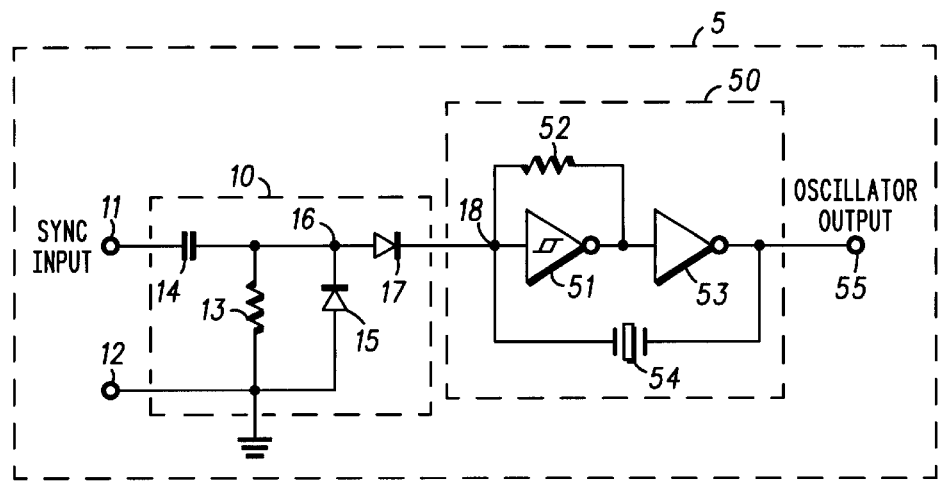
FIG. 1 shows a preferred embodiment of a synchronisation arrangement in accordance with the invention.

Referring to FIG. 1, there is shown a synchronisation arrangement 5, comprising an input stage 10 and an oscillator circuit 50. The input stage 10 has a synchronisation input having positive and negative terminals 11 and 12 respectively. An input resistor (of typically 10 kΩ) is coupled between the positive and negative terminals 11 and 12, and an input capacitor 14 (of typically 10 pF) is coupled between the input resistor 13 and the positive terminal 11. The negative terminal 12 is coupled to ground.

A first diode 15 is coupled between the negative terminal 12 and a node 16. The node 16 lies between the capacitor 14 and an output coupled to the oscillator stage. A second diode 17 is coupled between the node 16 and the output to the oscillator stage.

In this way the input resistor 13 and capacitor 14 are provided to condition a synchronisation signal present at the synchronisation input, and the first diode 15 is arranged to clip negative edges of the synchronisation signal.

The oscillator circuit 50 includes a first inverter 51, a feedback resistor 52 (of typically 330Ω) coupled across the first inverter 51, a second inverter 53 and a crystal oscillator 54 (of typically 10 MHz) coupled in a feedback path between the output of the second inverter 53 and the input of the first inverter 51. It will be appreciated that this oscillator circuit 50 is a standard crystal controlled oscillator circuit.

In operation, positive edges from the synchronisation signal pass to the input of the first oscillator 51, and a small amount of corresponding charge injected will cause the signal at the input of the oscillator 51 to rise slightly faster if the signal at node 18 is rising, and to fall slightly lower if the signal at node 18 is falling.

Figure 2:
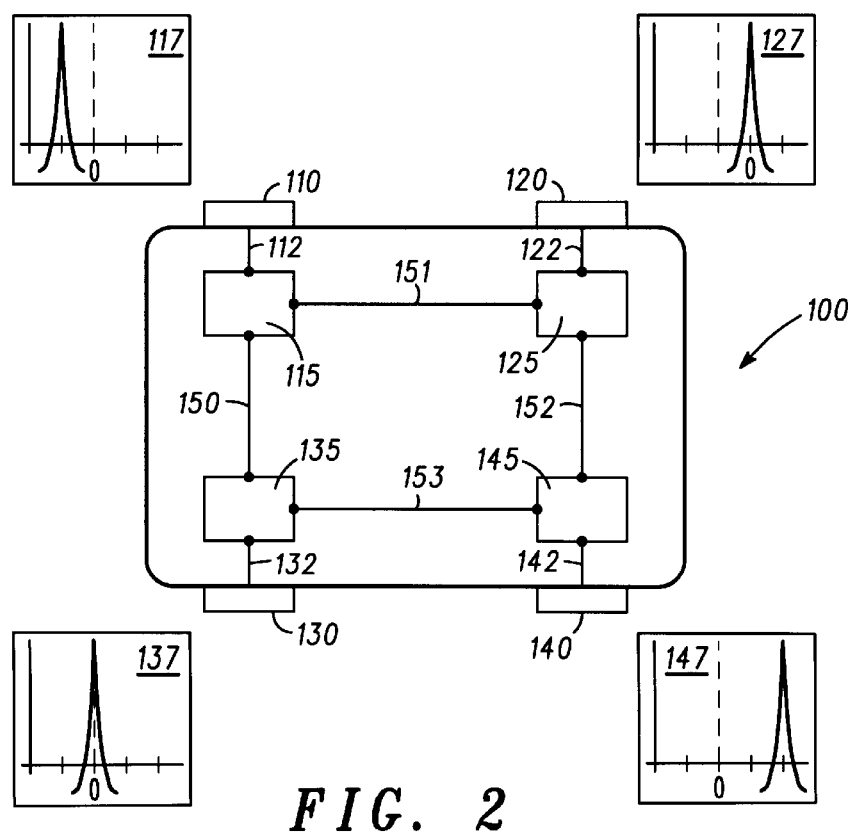
FIG. 2 shows a distributed microcontroller network employing the synchronisation arrangement of FIG. 1; and, FIG. 3 shows a graph illustrating the function of the synchronisation arrangement of FIG. 1.

Referring now also to FIG. 2, there is shown an illustrative block diagram of a distributed microcontroller network 100 in the form of a brake-by-wire system, incorporated in an automobile. The automobile has four wheels, 110, 120, 130 and 140. Each wheel has an associated brake module 115, 125, 135, 145 coupled to a brake actuator (not shown) of each respective wheel via a connection 112, 122, 132, 142.

Each brake module 115, 125, 135, 145 has a microcontroller arranged to control the functions of the module, including the function of the brake actuator (not shown) and to exchange control signals with a network (150, 151, 152, 153). The speed of the network interface is set by the same crystal oscillator that controls the microcontroller.

Typically in a brake-by-wire system such as the system illustrated, a pedal module (not shown) provides input to the system from a driver of the automobile. The pedal module (or pedal node as it is sometimes referred to) then transmits control signals to the brake modules (or brake nodes) 115, 125, 135, 145 via the network (150, 151, 152, 153). The brake nodes also transmit control signals, alerting each other to their status such that if a fault should develop, appropriate action can be taken. As has been stated above, it is critical in such a system that each brake node responds at the same time to an instruction from the pedal node to apply the brakes, because if the brakes are permitted to operate asynchronously, differential forces would act upon the automobile, causing stress on the chassis and possibly leading to loss of driving control.

Each microcontroller has a master oscillator, having a nominal frequency in the order of 10 MHz. Although these may be very accurate, and be started at exactly the same time (at system startup) after a few moments they will invariably no longer be synchronised, leading to the above problems.

Therefore, the master oscillator of each microcontroller is provided with the synchronisation arrangement shown in FIG. 1. The synchronisation input is simply coupled to the control signal pulses received via the network. In this way, the phase difference between a rising edge of a pulse received from the network and a rising edge of the master oscillator output causes a signal to be injected into the oscillator circuit 50. This has the effect of either increasing or decreasing the frequency (depending on whether the rising edge of the network leads or lags that of the oscillator), and hence reducing the phase difference.

Each pulse received is substantially synchronised with the internal clock frequency of the microcontroller which originated the pulse. Therefore each brake node, when it receives a pulse from the network, undergoes an adjustment to its oscillator frequency which reduces the phase difference between its oscillator and the oscillator of the node which transmitted the pulse. Over time the nodes become mutually synchronised.

In the embodiment shown in FIG. 2, the network (150, 151, 152, 153) is not fully interconnected, but a daisy-chain arrangement. The node 115 is not directly connected to the node 145, but is directly connected via a first path 150 to node 135 and via a second path 151 to node 125. This does not however affect the mutual synchronisation, as can be seen from the graphs 117, 127, 137 and 147, which show the relative positions (in time) of the rising edges of the oscillators in nodes 115, 125, 135 and 145 respectively.

Figure 3:
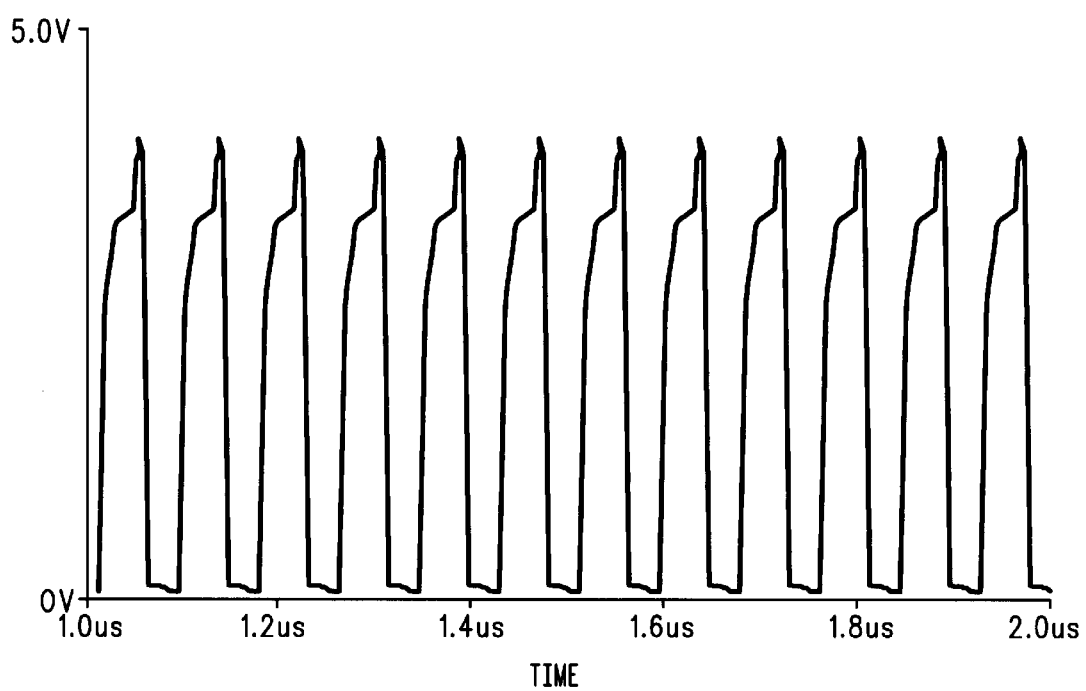

The node 115 has an oscillator rising edge which is early (before) in relation to a nominal datum 0. The node 135 has an oscillator rising edge which is approximately at the nominal datum 0. Therefore when the node 135 transmits a control signal via path 150 to node 115, the synchronisation arrangement at node 115 will cause the oscillator at node 115 to slightly reduce the oscillation frequency. Similarly when the node 115 transmits a control signal via path 150 to node 135, the synchronisation arrangement of node 135 will cause the oscillator at node 135 to slightly increase the oscillation frequency. FIG. 3 shows a 12 MHz oscillator locking to a 5.95 MHz synchronisation signal over a period of 2 microseconds.

If these nodes were the only nodes of the system, it is readily apparent that over time, they will become synchronised. However, the system as shown with four nodes, will also become synchronised over time, as each node receives pulses from its neighbours, and adjusts its frequency accordingly.

It will be appreciated that alternative embodiments to the one described above are possible. For example, the precise arrangement of the synchronisation arrangement could be different from that described above, and the number of nodes of the system could be less than or greater than four. Furthermore, the network could be used in an application other than a brake-by-wire system for an automobile.

What is claimed is:

1. A synchronisation arrangement for a distributed microcontroller network, comprising:

a plurality of distributed microcontrollers, each having an internal clock frequency and a frequency correction arrangement coupled to selectively adjust the internal clock frequency, each of the microcontrollers being further arranged to transmit data signals via the network, the data signals having periodic logic level transitions which are substantially synchronised to the internal clock frequency of the microcontroller, wherein each of the plurality of microcontrollers is arranged to selectively adjust its internal clock frequency in dependence upon a phase difference between the internal clock frequency and the logic level transitions of the data signals received via the network, such that the clock frequencies of the plurality of microcontrollers become substantially phase-synchronised wherein the distributed microcontroller network is a brake-by-wire automobile braking system incorporated in an automobile.

2. The arrangement of claim 1 wherein the frequency correction arrangement comprises:

an input stage for receiving data signals and for producing at an output a signal representative of the received data signals, and an oscillator stage coupled to the output of the input stage and arranged to vary its oscillation frequency in dependence on the signal thereat.

3. The arrangement of claim 2 wherein the input stage comprises first and second terminals for receiving therebetween the data signals, and a signal conditioning arrangement.

4. The arrangement of claim 3 wherein the conditioning arrangement comprises a resistance coupled between the first terminal and the second terminal and a capacitance coupled in series with one of the first and second terminals.

5. The arrangement of claim 3 wherein the input stage comprises a rectifier coupled between the first and second terminals.

6. The arrangement of claim 2 wherein the oscillator stage comprises a first inverter and a second inverter coupled in series, a feedback element coupled between the output and the input of the first inverter, and a reference oscillator element coupled between the input of the first inverter and the output of the second inverter.

7. The arrangement of claim 1 wherein the plurality of distributed microcontrollers are connected in a daisy chain arrangement.

8. A method for synchronising internal clock frequencies of a plurality of microcontrollers in a distributed microcontroller network, comprising the steps of exchanging data signals between the plurality of microcontrolers via the network, the data signals having periodic logic level transitions which are substantially synchronised to the internal clock frequency of the microcontroller, adjusting the internal clock frequency of each of the microcontrollers in dependence upon a phase difference between the internal clock frequency and the logic level transitions of the data signals received via the network, such that the clock frequencies of the plurality of microcontrollers become substantially phase-synchronised wherein the distributed microcontroller network is a brake-by-wire automobile braking system incorporated in an automobile.

9. The method of claim 8 wherein the step of adjusting the internal frequency comprises:

receiving data signals and producing an output signal representative thereof, and varying an oscillation frequency in dependence on the output signal.

10. The method of claim 9 wherein the step of receiving data signals and producing an output signal representative thereof comprises receiving data signals between first and second terminals, and conditioning the signal between the first and second terminals.

11. The method of claim 10 wherein the step of conditioning comprises providing a resistance coupled between the first terminal and the second terminal and a capacitance coupled in series with one of the first and second terminals.

12. The method of claim 10 wherein the step of receiving data signals and producing an output signal representative thereof comprises providing a rectifier coupled between the first and second terminals.

13. The method of claim 9 wherein the step of varying an oscillation frequency comprises providing an oscillator stage having a first inverter and a second inverter coupled in series, a feedback element coupled between the output and the input of the first inverter, and a reference oscillator element coupled between the input of the first inverter and the output of the second in inverter.

14. The method of claim 8 wherein the plurality of distributed microcontrollers are connected in a daisy chain arrangement.

* * * * *